Feb. 3, 1970     C. E. SHAW     3,493,255
DOOR MOVEMENT RESTRAINT MEANS
Filed Oct. 20, 1966
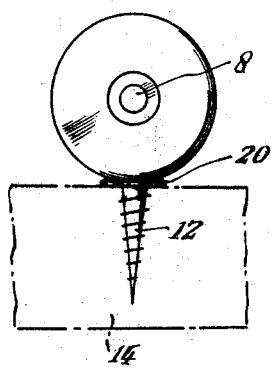
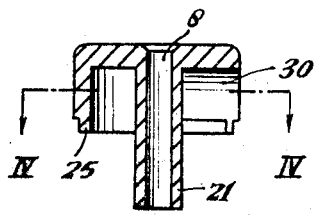
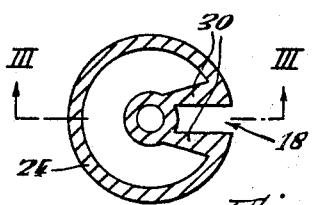
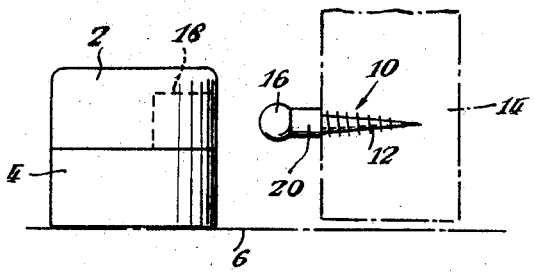
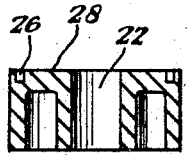
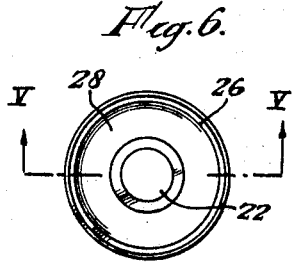
INVENTOR
CHARLES E. SHAW
By Jacob & Jacobs
ATTORNEYS

3,493,255
DOOR MOVEMENT RESTRAINT MEANS
Charles E. Shaw, Sa Costa, Calvia, Mallorca, Spain
Filed Oct. 20, 1966, Ser. No. 588,182
Claims priority, application Great Britain, Nov. 2, 1965, 46,450/65
Int. Cl. E05c *19/02*
U.S. Cl. 292—70     2 Claims

ABSTRACT OF THE DISCLOSURE

The specification discloses a device combining the functions of a door stop and a retainer in which by use of a resilient abutting surface the movement of the door is cushioned as it strikes the device while an integral engagement passage is provided to receive a member attached to the door so that the door is then releasably retained by the resilient grip of the passage walls on the member.

---

This invention relates to means for restraining uncontrolled movements of an open door.

According to the invention, there is provided door movement restraint means comprising a body having provision for fixing to the floor and an engagement member having provision for fixing to the door, said body having an aperture or recess formed in a side wall thereof and defining an integral engagement passage having vertical, laterally opposed sides and into which the engagement member can be releasably entered, at least said side wall of the body being formed from a resilient material whereby the laterally opposed sides of the engagement passage form a resilient catch gripping opposite sides of the engagement member and said side wall provides a resilient stop for movement of the door.

One embodiment of the present invention will be more particularly described with reference to the accompanying drawing wherein:

FIGS. 1 and 2 show plan and side views of a mounted restraint means showing its engagement member in gripped and released positions respectively, FIGS. 3 and 4 show, respectively, a sectional side view in the direction III—III and a sectional plan view in the direction IV—IV of the upper part of the body of the means in FIGS. 1 and 2 and FIGS. 5 and 6 show respectively a sectional side view in the direction V—V and a plan view from above of the lower part of said body.

Referring to the drawings, the hollow body of the door movement restraint means comprises upper and lower parts 2, 4 and is secured to the floor 6 by a screw (not shown) passing through a countersunk central aperture 8 or by like securing means. The engagement member 10 comprises a screwed shank 12, by which it is secured to the door 14, and a spherical head 16 which can be engaged by the body, there being an aperture or recess 18 formed in a side wall of the body to extend inwardly therefrom and define an engagement passage which is located to face the door when open, said passage acting as a resilient catch gripping opposite sides of the engagement member head. A washer or an integral collar 20 on the member 10 maintains the head 16 proud of the door surface. The collar diameter is equal to or slightly less than the engagement passage width so that it can enter freely therein and ensure that the head 16 is securely gripped.

Both parts 2, 4 are moulded as hollow cylindrical shells and the aperture 8 is formed in a hollow core 21 of the upper part 2 which is push-fitted in a bore 22 in the lower part when the body parts are assembled. From the bottom of cylindrical shell wall 24 of the upper part, an annular rib 25 projects downwardly to be located in a complementary recess 26 in the top face 28 of the lower part.

The recess 18 in the wall 24 of the upper part extends to the bottom face of the upper part so that the lower part 4 forms the lower boundary of the recess 18. Inwardly directed, vertical walls 30 in the upper part povide lateral boundaries of the recess 18 from the wall 24 to the core 21.

The two parts of the body are moulded from a plastics material such as polyethylene which provides suitable resilience to act both as an end stop for the door and as a catch to releasably retain the head 16 when it is inserted in the recess 18. The relative resilience of the body for these two effects can be adjusted separately of each other; for example, the profile of the walls 30 can be arranged to increase the effective stiffness of the C-spring effect produced by the wall 24 without substantially affecting the resilient effect afforded by the body as an abutment limiting opening of the door.

It is, of course, possible to make various modifications of the illustrated construction within the scope of the claims. Thus, the recess 18 may have an abrasion-resistant lining applied to it and may be given a wider cross-section away from its entry face. The vertical extent of the recess 18, is, in any case, preferably larger than the vertical extent of the engagement member head 16 since this will allow functioning of the means to continue unimpaired even if, as is usual, the door in time drops slightly on its hinges. In a modified construction, the body of the means is of composite form, only the side wall in which the aperture or recess is formed being of resilient material; such an arrangement would, of course, be so designed as to provide the dual functions described above of releasable retainer and resilient stop.

What I claim and desire to secure by Letters Patent is:

1. Door movement restraint means comprising, in combination, a body and an engagement member, means for fixing the body to a floor and for fixing the engagement member to a door, the body comprising respective upper and lower parts moulded in a resilient plastics material, said upper part being in the form of a hollow shell, an outer side wall of said upper part shell having an aperture or recess to define an integral engagement passage into which the engagement member can be entered, vertical laterally opposed sides of the passage forming engagement surfaces for said member, whereby said engagement surfaces form a resilient catch gripping opposite sides of the engagement member and said side wall provides a resilient end stop for movement of the door, a hollow core being provided in said upper part shell and projecting from the lower end thereof, receiving means formed in the body lower part to engage the core and to locate the parts relative to each other, the aperture or recess terminating at the junction of the upper and lower parts and a floor-fixing element for the body being insertable through the hollow core.

2. Door movement restraint means comprising, in combination, a body and an engagement member, means for fixing the body to a floor and for fixing the engagement member to a door, the body being formed from upper and lower parts each moulded in a resilient plastics material, the upper part being in the form of a hollow shell having an outer side wall and an inner core spaced therefrom, said upper part further including wall portions between said side wall and core forming laterally opposed sides of an aperture or recess defining an integral engagement passage into which the engagement member can be entered, said opposed sides thereby providing a resilient catch gripping opposite sides of the engagement member and said side wall providing a resilient end stop for the movement of the door, said core depending below the upper part and a vertically directed aperture in the lower part being arranged to receive the core to assemble together the upper and lower parts, a top face of the lower part abutting the upper part to provide a bottom surface of the engagement passage.

References Cited

UNITED STATES PATENTS

| 2,767,005 | 10/1956 | Jorgensen | 292—70 |
| 3,038,747 | 6/1962 | Rapata | 292—17 |

FOREIGN PATENTS 65,689  12/1913  Switzerland.

J. KARL BELL, Primary Examiner

U.S. Cl. X.R.

292—17